US011309604B2

(12) United States Patent
Tyler et al.

(10) Patent No.: US 11,309,604 B2
(45) Date of Patent: Apr. 19, 2022

(54) THERMAL EPOXY AND POSITIONING OF ELECTROCHEMICAL CELLS

(71) Applicant: CPS Technology Holdings LLC, New York, NY (US)

(72) Inventors: Matthew R. Tyler, Brown Deer, WI (US); Xugang Zhang, Glendale, WI (US); Richard M. DeKeuster, Racine, WI (US); Christopher M. Bonin, Glendale, WI (US); Dale B. Trester, Glendale, WI (US)

(73) Assignee: CPS Technology Holdings LLC, New York, NY (US)

( * ) Notice: Subject to any disclaimer, the term of this patent is extended or adjusted under 35 U.S.C. 154(b) by 1061 days.

(21) Appl. No.: 14/815,515

(22) Filed: Jul. 31, 2015

(65) Prior Publication Data

US 2016/0301046 A1 Oct. 13, 2016

Related U.S. Application Data

(60) Provisional application No. 62/146,811, filed on Apr. 13, 2015, provisional application No. 62/146,763, (Continued)

(51) Int. Cl.
*H01M 50/267* (2021.01)
*H01M 50/502* (2021.01)
(Continued)

(52) U.S. Cl.
CPC ............ *H01M 50/20* (2021.01); *C09J 163/00* (2013.01); *H01M 10/0413* (2013.01);
(Continued)

(58) Field of Classification Search
CPC ............. C09J 163/00; H01M 10/0413; H01M 10/0525; H01M 10/058; H01M 10/613;
(Continued)

(56) References Cited

U.S. PATENT DOCUMENTS 5,977,746 A 11/1999 Hershberger et al.
8,039,145 B2 10/2011 Ha et al.
(Continued)

FOREIGN PATENT DOCUMENTS

CN 101611463 A 12/2009
CN 102263212 A 11/2011
(Continued)

OTHER PUBLICATIONS

PCT/US2016/018453 International Search Report and Written Opinion dated Jun. 20, 2016.

*Primary Examiner* — Haixia Zhang
(74) *Attorney, Agent, or Firm* — Boardman & Clark LLP (57) ABSTRACT

The present disclosure includes a battery module having a housing with a first end (having a cell receptacle region) and a second end opposite to the first end. The battery module includes a stack of electrochemical cells inserted through the cell receptacle region of the housing, disposed between the first end and the second end of the housing, and having terminal ends of all the electrochemical cells of the stack aligned in a planar area. The battery module includes a bus bar carrier disposed over the stack of electrochemical cells and within the cell receptacle region of the housing. The bus bar carrier includes bus bars disposed thereon that interface with the terminal ends. The battery module includes a layer of thermal epoxy disposed between the second end of the housing and a bottom side of the stack of electrochemical cells.

8 Claims, 4 Drawing Sheets

Related U.S. Application Data filed on Apr. 13, 2015, provisional application No. 62/146,816, filed on Apr. 13, 2015.

(51) Int. Cl.

| | | |
|---|---|---|
| *H01M 10/6554* | (2014.01) | |
| *H01M 50/20* | (2021.01) | |
| *H01M 10/0525* | (2010.01) | |
| *H01M 10/058* | (2010.01) | |
| *H01M 10/6555* | (2014.01) | |
| *H01M 10/6551* | (2014.01) | |
| *H01M 50/24* | (2021.01) | |
| *H01M 50/112* | (2021.01) | |
| *H01M 50/411* | (2021.01) | |
| *H01M 50/543* | (2021.01) | |
| *H01M 10/04* | (2006.01) | |
| *H01M 10/613* | (2014.01) | |
| *H01M 10/625* | (2014.01) | |
| *H01M 10/653* | (2014.01) | |
| *C09J 163/00* | (2006.01) | |
| *H01M 10/647* | (2014.01) | |

(52) U.S. Cl.
CPC ..... *H01M 10/058* (2013.01); *H01M 10/0525* (2013.01); *H01M 10/613* (2015.04); *H01M 10/625* (2015.04); *H01M 10/653* (2015.04); *H01M 10/6551* (2015.04); *H01M 10/6554* (2015.04); *H01M 10/6555* (2015.04); *H01M 50/112* (2021.01); *H01M 50/24* (2021.01); *H01M 50/267* (2021.01); *H01M 50/411* (2021.01); *H01M 50/502* (2021.01); *H01M 50/543* (2021.01); *H01M 10/647* (2015.04); *H01M 2220/20* (2013.01)

(58) Field of Classification Search
CPC ............ H01M 10/625; H01M 10/653; H01M 10/6551; H01M 10/6554; H01M 10/6555; H01M 50/112; H01M 50/20; H01M 50/24; H01M 50/267; H01M 50/411; H01M 50/502; H01M 10/647; H01M 2220/20; Y02E 60/10

See application file for complete search history.

(56) References Cited

U.S. PATENT DOCUMENTS

| | | |
|---|---|---|
| 8,632,898 B2 | 1/2014 | Dougherty et al. |
| 9,034,506 B2 | 5/2015 | Michelitsch et al. |
| 9,077,043 B2 | 7/2015 | Takatsuka et al. |
| 9,225,035 B1 | 12/2015 | Werre et al. |
| 9,246,198 B2 | 1/2016 | Reynier et al. |
| 9,263,724 B2 | 2/2016 | Bae et al. |
| 9,331,313 B2 | 5/2016 | Bang et al. |
| 2006/0286441 A1 | 12/2006 | Matsuoka |
| 2009/0311581 A1 | 12/2009 | Park et al. |
| 2011/0293973 A1* | 12/2011 | Kim ...................... H01M 2/04 429/53 |
| 2012/0114991 A1* | 5/2012 | Park .................... H01M 2/1077 429/82 |
| 2012/0263988 A1 | 10/2012 | Kem et al. |
| 2012/0308873 A1 | 12/2012 | Masahiro et al. |
| 2013/0230746 A1 | 9/2013 | Byun |
| 2013/0236768 A1 | 9/2013 | Park et al. |
| 2013/0337310 A1 | 12/2013 | Omura et al. |
| 2014/0177141 A1 | 6/2014 | Cao |
| 2014/0322581 A1 | 10/2014 | Ruter et al. |
| 2015/0079447 A1* | 3/2015 | Park ...................... H01M 2/204 429/121 |
| 2015/0311485 A1 | 10/2015 | Fister et al. |
| 2016/0093930 A1* | 3/2016 | Biskup ................ H01M 10/625 429/72 |

FOREIGN PATENT DOCUMENTS

| | | |
|---|---|---|
| CN | 203631621 U | 6/2014 |
| EP | 2800198 | 11/2014 |
| WO | 9905746 A1 | 2/1999 |
| WO | 2012147801 A1 | 11/2012 |
| WO | 2015196046 A1 | 12/2015 |

* cited by examiner

THERMAL EPOXY AND POSITIONING OF ELECTROCHEMICAL CELLS

CROSS-REFERENCE TO RELATED APPLICATIONS

This application claims priority from and the benefit of U.S. Provisional Application Ser. No. 62/146,811, filed Apr. 13, 2015, entitled "B-CARRIER TO CELL THERMAL EPOXY INTERFACE DESIGN FOR MANAGING CELL HEIGHT," U.S. Provisional Application Ser. No. 62/146,763, filed Apr. 13, 2015, entitled "CELL TO CELL ADHESIVE TAPE," and U.S. Provisional Application Ser. No. 62/146,816, filed Apr. 13, 2015, entitled "CELL TO HEAT SINK THERMAL EPOXY," which are hereby incorporated by reference in their entireties for all purposes. This application is related to U.S. Non-Provisional application Ser. No. 14/815,415, entitled "ADHESIVE TAPE FOR POSITIONING BATTERY CELLS IN A BATTERY MODULE," filed on even date herewith, now U.S. Pat. No. 10,403,869, and U.S. Non-Provisional application Ser. No. 14/815,447, entitled "CELL TO HEAT SINK THERMAL ADHESIVE," filed on even date herewith, now U.S. Pat. No. 10,700,317, both of which are incorporated herein by reference in their entireties for all purposes.

BACKGROUND

The present disclosure relates generally to the field of batteries and battery modules. More specifically, the present disclosure relates to thermal epoxy and positioning of electrochemical cells within a housing of a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include electrochemical cells having slightly different heights relative to each other due to manufacturing imperfections (e.g., engineering tolerances). Unfortunately, the electrochemical cells having slightly different heights relative to each other can complicate electrical coupling of the electrochemical cells, positioning of the electrochemical cells, and assembly of the battery module in general. Accordingly, it is now recognized that improved positioning of electrochemical cells in a battery module is desired.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module having a housing with a first end (having a cell receptacle region) and a second end opposite to the first end. The battery module includes a stack of electrochemical cells inserted through the cell receptacle region of the housing, disposed between the first end and the second end of the housing, and having terminal ends of all the electrochemical cells of the stack aligned in a planar area. The battery module includes a bus bar carrier disposed over the stack of electrochemical cells and within the cell receptacle region of the housing. The bus bar carrier includes bus bars disposed thereon that interface with the terminal ends. The battery module includes a layer of thermal epoxy disposed between the second end of the housing and a bottom side of the stack of electrochemical cells.

The present disclosure also relates a housing of a battery module having a base wall of a housing, a layer of compliant epoxy disposed on the base wall of the housing, and electrochemical cells disposed on the layer of compliant epoxy such that the layer of compliant epoxy is sandwiched between the electrochemical cells and the base wall of the housing. The electrochemical cells are positioned in a stack such that each electrochemical cell includes a terminal end aligned with a flat top plane of the stack. The layer of compliant epoxy conforms to unaligned base ends of the electrochemical cells disposed opposite to the terminal ends of the electrochemical cells and proximate to the base wall of the housing.

The present disclosure also relates to a method of manufacturing a battery module includes aligning terminal ends of a first, second, and third electrochemical cell such that all the terminal ends are disposed in a single plane, adhering the first, second, and third electrochemical cells to one another, disposing the first, second, and third electrochemical cells into a housing of the battery module, and disposing the first, second, and third electrochemical cells onto a layer of compliant thermal epoxy disposed on a bottom wall of the housing such that the layer of compliant thermal epoxy supports base ends of the first, second, and third electrochemical cells opposite to the terminal ends of the first, second, and third electrochemical cells.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, the battery module may include a housing and electrochemical cells disposed within the housing. For example, the housing may include a cell receptacle region (e.g., opening) configured to receive the electrochemical cells. The battery module may include a cover disposed over the cell receptacle region after the electrochemical cells are disposed within the housing, and a lid (e.g., bus bar carrier) disposed between the cover and the electrochemical cells. For example, the bus bar carrier may include bus bars and other electrical components disposed thereon, where the bus bars are configured to interface with terminals of the electrochemical cells to electrically connect the electrochemical cells.

In accordance with present embodiments, the electrochemical cells may be aligned with one another in one or more stacks of electrochemical cells. The electrochemical cells may be so positioned such that top sides (e.g., top ends, terminal ends) of the electrochemical cells are substantially aligned with one another in a single plane. In other words, the stack(s) of electrochemical cells may include a top end (e.g., top planar area) in which the top sides of the electrochemical cells are disposed. The terms top, bottom, side, and so forth are relative terms and are used herein based on illustrated embodiments. However, these terms are further described relative to features such as terminals to better describe different orientations.

Due to manufacturing imperfections (e.g., engineering tolerances) of the electrochemical cells, certain or each of the electrochemical cells may include a different height than the other electrochemical cells. Further, due to manufacturing imperfections (e.g., engineering tolerances) of the housing and/or the bus bar carrier, certain or each of the electrochemical cells may be disposed on different levels (e.g., may not be aligned) relative to one another within the housing. In accordance with present embodiments, a layer of epoxy (e.g., thermal epoxy, compliant thermal epoxy) may be disposed proximate to bottom sides (e.g., bottom ends) of the electrochemical cells opposite to the top sides of the electrochemical cells. It should be noted that, depending on the embodiment, the epoxy may not be thermal epoxy, but that thermal epoxy may provide certain benefits described in detail below and, thus, the term "thermal epoxy" is used to describe certain of the embodiments embodiments. For example, the layer of thermal epoxy may be disposed (e.g., sandwiched) between the bottom sides of the electrochemical cells (e.g., along a bottom end of the stack of electrochemical cells) and a bottom surface or wall of the housing. Because each of the electrochemical cells may include a different height and because the electrochemical cells are aligned with one another across their top sides, the bottom sides of the electrochemical cells may not be aligned in a single plane. Accordingly, the layer of thermal epoxy between the bottom sides of the electrochemical cells and the bottom wall of the housing may conform about the bottom sides of the electrochemical cells to fill a space between the bottom sides of the electrochemical cells and the bottom wall of the housing. In other words, the layer of thermal epoxy may conform to the bottom sides of the electrochemical cells to compensate for the electrochemical cells' differences in height.

In general, the thermal epoxy facilitates alignment of the top sides of the electrochemical cells by accommodating misalignments of the bottom sides of the electrochemical cells to address variations in heights of the electrochemical cells and equalize forces exerted by, and against, the electrochemical cells. In other words, because of the aligned top sides of the electrochemical cells facilitated by the layer of thermal epoxy, forces exerted between bus bars of the bus bar carrier and terminals of the electrochemical cells (e.g., in order to facilitate coupling/welding of the bus bars and the terminals) may be substantially equal across the battery module. Further, the layer of thermal epoxy enables improved heat transfer from the bottom sides of the electrochemical cells to the bottom wall of the housing of the battery module and/or to one or more heat sinks disposed in the bottom wall of the housing.

Figure 1:
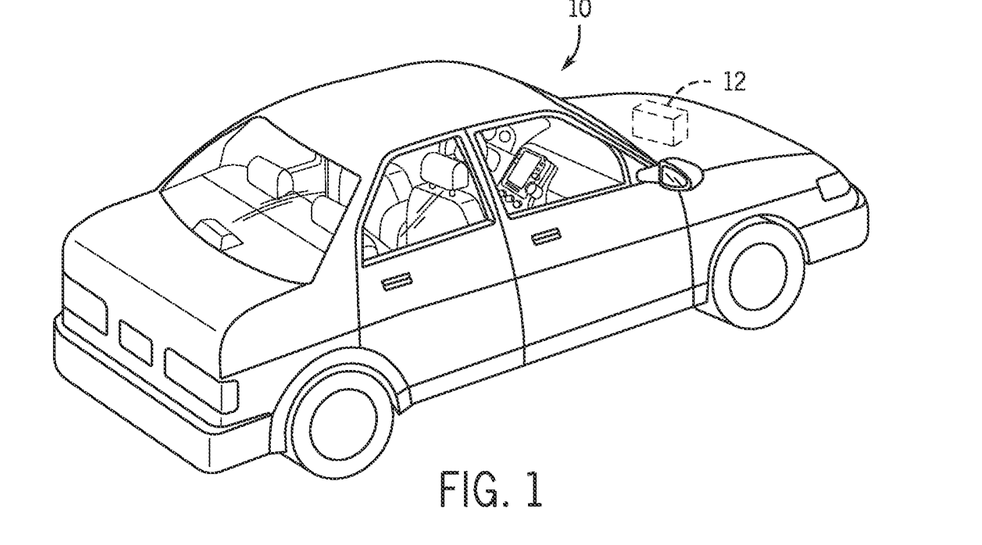
FIG. 1 is a perspective view of a vehicle having a battery system configured in accordance with present embodiments to provide power for various components of the vehicle.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
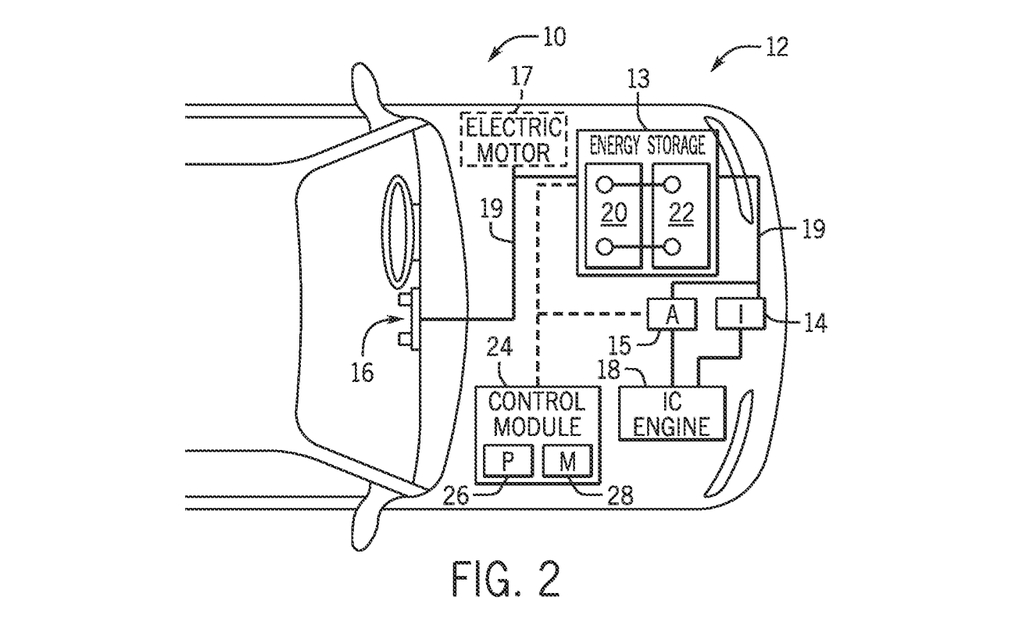
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
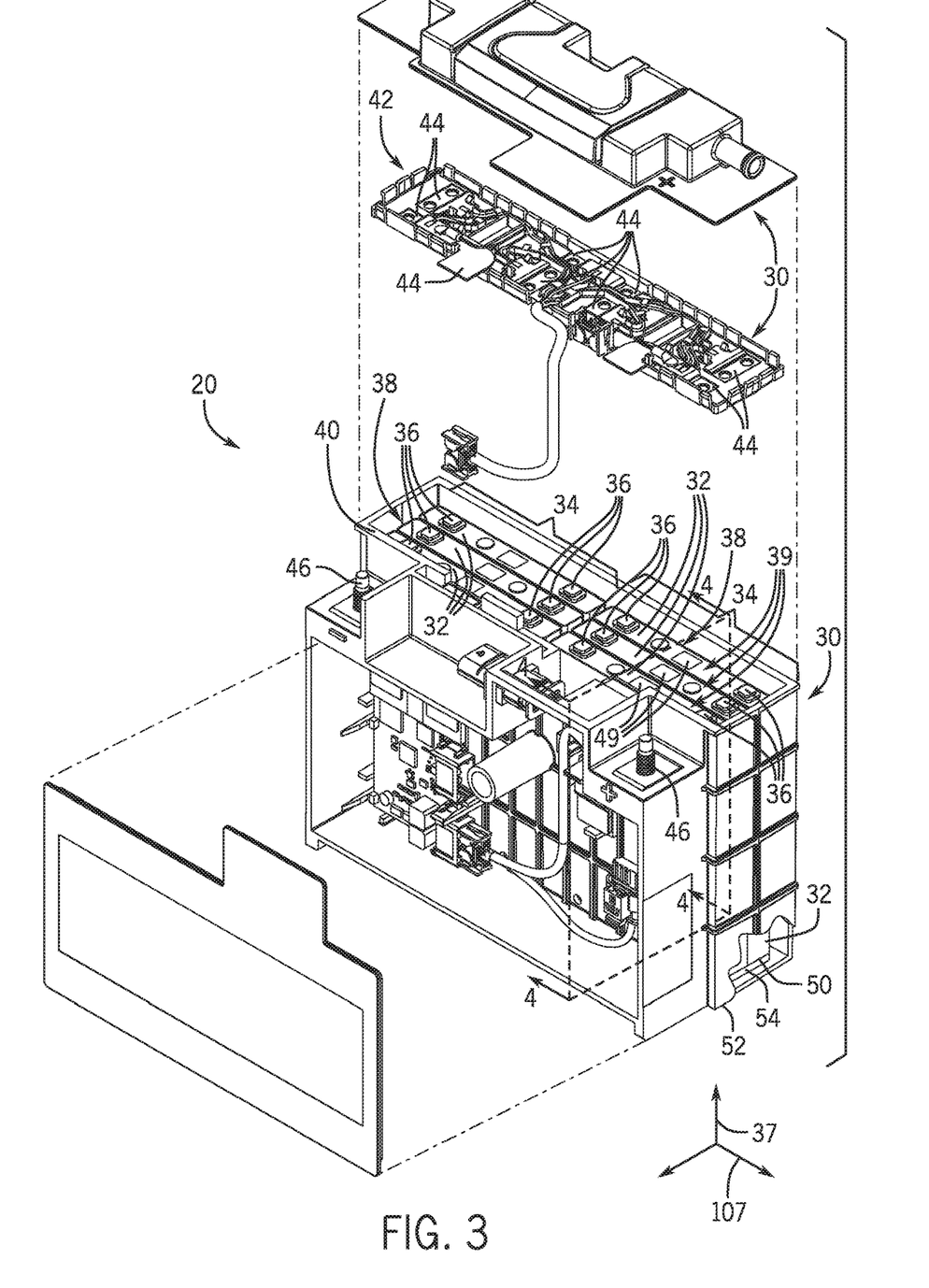
FIG. 3 is an exploded cutaway perspective view of an embodiment of a battery module for use in the vehicle of FIG. 2, in accordance with an aspect of the present disclosure.

An overhead exploded perspective view of an embodiment of the battery module 20 for use in the vehicle 10 of FIG. 2 is shown in FIG. 3. In the illustrated embodiment, the battery module 20 (e.g., lithium ion [Li-ion] battery module) includes a housing 30 and electrochemical cells 32 disposed inside the housing 30. For example, the electrochemical cells 32 are received through a cell receptacle region 38 (e.g., opening) of the housing 30 and into the inside of the housing 30. In the illustrated embodiment, six prismatic lithium-ion (Li-ion) electrochemical cells 32 are disposed in two stacks 34 within the housing 30, three electrochemical cells 32 in each stack 34. However, in other embodiments, the battery module 20 may include any number of electrochemical cells 32 (e.g., 2, 3, 4, 5, 6, 7, 8, 9, 10, or more electrochemical cells), any type of electrochemical cell 32 (e.g., Li-ion, lithium polymer, lead-acid, nickel cadmium, or nickel metal hydride, prismatic, and/or cylindrical), and any arrangement of the electrochemical cells 32 (e.g., stacked, separated, or compartmentalized).

As shown, the electrochemical cells 32 may include terminals 36 extending upwardly (e.g., in direction 37) from terminal ends 39 of the electrochemical cells 32. Accordingly, the terminals 36 may extend into the cell receptacle region 38 in an upper side 40 (e.g., upper end, upper face) of the housing 30. For example, the electrochemical cells 32 may be inserted into the housing 30 through the cell receptacle region 38 in the upper side 40, and positioned within the housing 30 such that the terminals 36 of the electrochemical cells 32 are disposed in the cell receptacle region 38. A bus bar carrier 42 may be disposed into the cell receptacle region 38 and may retain bus bars 44 disposed thereon, where the bus bars 44 are configured to interface with the terminals 36 of the electrochemical cells 32. For example, the bus bars 44 may interface with the terminals 36 to electrically couple adjacent electrochemical cells 32 together. Depending on the embodiment, the bus bars 44 may couple the electrochemical cells 32 in series, in parallel, or some of the electrochemical cells 32 in series and some of the electrochemical cells 32 in parallel. Further, certain of the bus bars 44 may be configured to electrically couple the electrically interconnected group of electrochemical cells 32 with major terminals 46 of the battery module 20, where the major terminals 46 are configured to be coupled to a load (e.g., component(s) of the vehicle 10) to power the load. The electrochemical cells 32 also include vents 49 disposed on the terminal ends 39 of the electrochemical cells 32 and configured to enable gases from within the electrochemical cells 32 to vent into the inside of the housing 30 in certain operating conditions (e.g., if a pressure within one or more individual electrochemical cell 32 exceeds a cell venting pressure threshold of the corresponding one or more individual electrochemical cells 32).

In accordance with embodiments of the present disclosure, the terminal ends 39 (e.g., top sides, top ends) of the electrochemical cells 32 are generally aligned with one another in a single planar area. In other words, the stacks 34 of electrochemical cells 32 may each include a top plane in which the terminal ends 39 of the electrochemical cells 32 are generally disposed. The top planes of both stacks 34 may also be substantially in-plane with one another. Aligning the terminal ends 39 of the electrochemical cells 32 facilitates accurate coupling of the terminals 36 of the electrochemical cells 32 with the bus bars 44 on the bus bar carrier 42. It should be noted that being in-plane and aligned within a single plane is used herein to reference general alignment within a planar area and does not require a strict mathematical relationship.

Due to manufacturing imperfections (e.g., engineering tolerances), certain or each of the electrochemical cells 32 may include a different height compared to other of the electrochemical cells 32 (or, in some embodiments, may be disposed within the housing 30 on varying levels along their heights). Accordingly, by aligning the terminal ends 39 of the electrochemical cells 32 in a single plane, bottom ends 50 of the electrochemical cells 32 (e.g., opposite to the terminals ends 39 and disposed proximate to a bottom wall 52 [e.g., base wall, back wall, end wall] of the housing 30) may not be aligned. However, a layer of epoxy 54 (e.g., compliant thermal epoxy) may be disposed between the electrochemical cells 32 and the bottom wall 52 (e.g., base wall, back wall, end wall) of the housing 30 to support the bottom ends 50 of the electrochemical cells 32. In other words, the layer of epoxy 54 may conform in different ways at varying locations of the bottom ends 50 of the electrochemical cells 32 (e.g., arising from the varying heights of the electrochemical cells 32 between the terminal ends 39 and the bottom ends 50) in order to fill the space between the bottom ends 50 of the electrochemical cells 32 and the bottom wall 52 of the housing 30. Thus, the layer of epoxy 54 supports or enables the alignment of the terminal ends 39 of the electrochemical cells 32, thereby improving coupling of the terminals 36 of the electrochemical cells 32 and the bus bars 44 on the bus bar carrier 42. To sufficiently fill the space between the bottom wall 52 of the housing 30 and the bottom ends 50 of the electrochemical cells 32 and provide adequate support to the bottom ends 50 of the electrochemical cells 32 equally, the layer of epoxy 54 (e.g., utilized for 6 electrochemical cells 32) may include a volume in the range of 5 to 15 cubic centimeters (0.31 to 0.92 cubic inches), 7 to 13 cubic centimeters (0.43 to 0.79 cubic inches), or 8 to 12 cubic centimeters (0.49 to 0.73 cubic inches). For each electrochemical cell 32, the layer of epoxy 54 may include a cell-specific volume in the range of 0.83 cubic centimeters per cell to 2.5 cubic centimeters per cell (0.05 cubic inches per cell to 0.15 cubic inches per cell), 1.17 cubic centimeters per cell to 2.17 cubic centimeters per cell (0.07 cubic inches per cell to 0.13 cubic inches per cell), or 1.33 cubic centimeters per cell to 2 cubic centimeters per cell (0.08 cubic inches per cell to 0.12 cubic inches per cell). It should also be noted that the layer of compliant thermal epoxy may also improve heat transfer from the bottom ends 50 of the electrochemical cells 32 to the bottom wall 52 (and, in some embodiments, a heat sink disposed in the bottom wall 52) of the housing 30.

Figure 4:
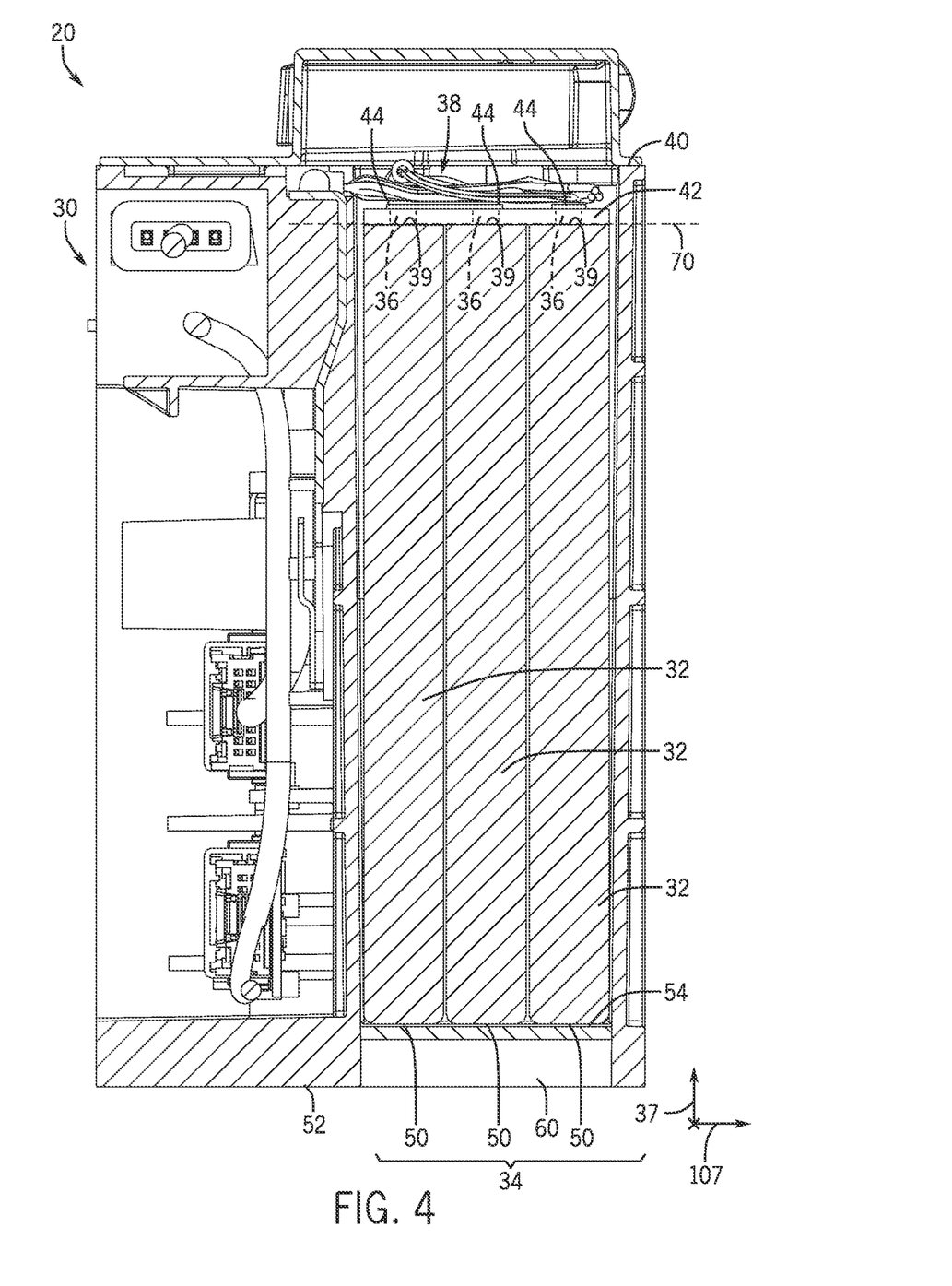
FIG. 4 is a cross-sectional assembled side view of the battery module of FIG. 3 taken along line 4-4 in FIG. 3, in accordance with an aspect of the present disclosure.

Turning now to FIG. 4, a cross-sectional assembled side view of the battery module 20 of FIG. 3, taken along line 4-4 in FIG. 3, is shown. In the illustrated embodiment, the terminal ends 39 of all the electrochemical cells 32 are aligned such that the terminal ends 39 are disposed in a single plane 70. As previously described, disposing the terminal ends 39 of the electrochemical cells 32 in the single plane 70 facilitates improved coupling of the bus bars 44 on the bus bar carrier 42 with the terminals 36 of the electrochemical cells 32. It should be noted that the terminals 36 extend from the respective electrochemical cells 32 in a direction substantially perpendicular to the single plane 70 for this reason.

As shown, the terminals 36 of the electrochemical cells 32 may extend through the bus bar carrier 42, such that the terminals 36 interface with the bus bars 42 disposed on an opposing side of the bus bar carrier 42 from the terminal ends 39 of the electrochemical cells 32. For example, the bus bar carrier 42 may include openings through which the terminals 36 extend to contact the bus bars 44. However, in another embodiment, the bus bars 44 may extend through the openings in the bus bar carrier 42 toward the terminal ends 39 of the electrochemical cells, such that the bus bars 44 interface with the terminals 36 extending from the terminal ends 39. In still another embodiment, the bus bars 44 and the terminals 36 may extend partially into openings in the bus bar carrier 42, such that the bus bars 44 and the terminals 36 interface within the openings. In general, and in accordance with the present disclosure, the connections between the bus bars 44 and the terminals 36 are improved by aligning the terminal ends 39 of the electrochemical cells 32 (e.g., at least in direction 37) such that the terminal ends 39 are all disposed in the single plane 70 (e.g., of the stack 34 of electrochemical cells 32).

While the terminal ends 39 of the electrochemical cells 32 are disposed in the single plane 70 to facilitate improved connections between the bus bars 44 and the terminals 36, the bottom ends 50 of the electrochemical cells 32 may be disposed in different planes (e.g., the bottom ends 50 are not aligned with one another along direction 37) due to height differences of the electrochemical cells 32 (e.g., height differences due to manufacturing imperfections or engineering tolerances). Accordingly, the layer of epoxy 54 (e.g., compliant thermal epoxy) is disposed proximate to the bottom ends 50 of the electrochemical cells 32 to accommodate the unaligned bottom ends 50. For example, the layer of epoxy 54 may be disposed along the inside of the bottom wall 52 of the housing 30, and the stack(s) 34 of electrochemical cells 32 may be inserted into the housing 30 (e.g., through the cell receptacle region 38) and pushed into (or disposed on) the layer of epoxy 54. The layer of epoxy 54 (e.g., compliant thermal epoxy) supports the bottom ends 50 of the electrochemical cells 32 and facilitates a heat transfer path from the bottom ends 50 of the electrochemical cells 32, through the layer of compliant thermal epoxy 54, and into the bottom wall 52 of the housing 30. In some embodiments, as described below, the bottom wall 52 of the housing 30 may include a heat sink 60 disposed thereon (or overmolded therein), where the layer of compliant thermal epoxy 54 is disposed between the electrochemical cells 32 and the heat sink 60 (e.g., physically contacting the heat sink 60).

Figure 5:
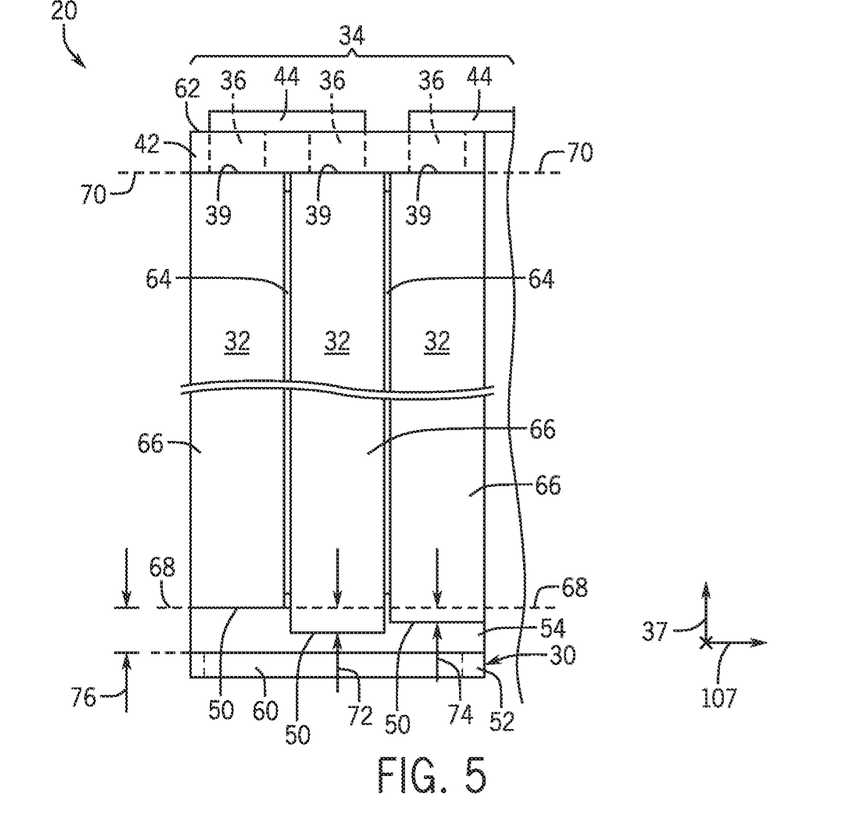
FIG. 5 is a schematic side view of an embodiment of a bus bar carrier, a stack of electrochemical cells, a layer of thermal epoxy, and a heat sink for use in the battery module of FIG. 3, in accordance with an aspect of the present disclosure.

Turning now to FIG. 5, a schematic side view of an embodiment of the bus bar carrier 42, the stack 34 of electrochemical cells 32, the layer of thermal epoxy 54, and the heat sink 60 for use in the battery module 20 of FIG. 3 is shown. In the illustrated embodiment, as previously described, the terminal ends 39 of the electrochemical cells 32 are aligned and disposed in the single plane 70 of the stack 34 of electrochemical cells 32. Accordingly, the terminals 36 of the electrochemical cells 32 are substantially aligned with one another to facilitate coupling of the bus bars 44 (e.g., disposed on a top 62 of the bus bar carrier 42) with the terminals 36.

In the illustrated embodiment, to facilitate alignment of the terminal ends 39 of the electrochemical cells 32 in the stack 34, the electrochemical cells 32 may be adhered to one another via double sided adhesive 64. For example, each pair of adjacent electrochemical cells 32 in the stack 34 may be coupled together via the double sided adhesive 64 being disposed between the electrochemical cells 32 of the pair. Accordingly, during assembly, the stack 34 of electrochemical cells 32 may be formed by disposing the double sided adhesive 64 on a first electrochemical cell 32, aligning a second electrochemical cell 32 with the first electrochemical cell 32 such that the terminal ends 39 are disposed in the single plane 70, and adhering the second electrochemical cell 32 to the double sided adhesive 64. A second double sided adhesive 64 may then be disposed on the opposing face of the second electrochemical cell 32 such that a third electrochemical cell 32 may be aligned with the first and second electrochemical cell 32 as described above and adhered to the second double sided adhesive 64. In the illustrated embodiment in particular, the stack 34 of electrochemical cells 32 includes three electrochemical cells 32. Accordingly, double sided adhesive 64 may be applied to opposing broad faces of the middle electrochemical cell 32 (e.g., broad faces extending along the heights of the electrochemical cells 32 along direction 37) of the three electrochemical cells 32. The two remaining electrochemical cells 32 (e.g., the outer electrochemical cells 32) may be pressed into the two double sided adhesives 64 applied to opposing broad faces of the middle electrochemical cell 32, thereby forming the stack 34 of electrochemical cells 32 with the top ends 39 disposed in the single plane 70 of the stack 34. It should be noted that other mechanisms may be included for fixing the electrochemical cells 32 to or with one another. For example, in another embodiment, a poncho-like feature may be disposed over the middle electrochemical cell 32, where the poncho like feature includes adhesive material on an outer surface that adheres to the two electrochemical cells 32 on either side of the middle electrochemical cell 32. It should be noted that the double sided adhesive 64 and/or the poncho-like feature may be electrically or thermally insulative to electrically or thermally isolate portions of adjacent electrochemical cells 32.

As previously described, due to manufacturing imperfections (e.g., engineering tolerances), one or more of the electrochemical cells 32 may include a different height than the other electrochemical cells 32. For example, in the illustrated embodiment, each electrochemical cell 32 includes a body 66 extending between the terminal end 39 of the electrochemical cell 32 and the bottom or base end 50 of the electrochemical cell 32. One of the electrochemical cell 32 includes a body 66 extending from the plane 70 of the stack 34 of electrochemical cells 32 to a first location 68 (e.g., parallel with direction 37) below the plane 70. The other two electrochemical cells 32 extend from the plane 70 of the stack 34 of electrochemical cells 32 to first and second distances 72, 74 beyond (e.g., below) the first location 68. In other words, the two electrochemical cells 32 extending beyond (e.g., below) the first location 68 by the first and second distances 72, 74 include bodies 66 of greater height than the first electrochemical cell 32 only extending to the first location 68. Depending on the embodiment, the various lengths of the electrochemical cells 32 may be arranged in different orders than shown in the illustrated embodiment.

In order to support the unaligned bottom ends 50 of the electrochemical cells 32 (e.g., extending different distances downwardly from the top plane 70), the layer of compliant thermal epoxy 54 is included between the bottom wall 52 of the housing 30 and the bottom ends 50 of the electrochemical cells 32. As the electrochemical cells 32 are pushed or disposed downwardly into the layer of compliant thermal epoxy 54, the layer of compliant thermal epoxy 54 conforms to the the bottom ends 50 (e.g., which may not be aligned along direction 37, as described above). Accordingly, a thickness 76 (e.g., in direction 37) of the layer of compliant thermal epoxy 54, upon assembly of the battery module 20, may vary along direction 107. The electrochemical cells 32 will be maintained in the same orientation relative to each of the other by bonding between them. The layer of compliant thermal epoxy 54 supports each of the bottom ends 50 of the electrochemical cells 32 substantially equally, such that forces exerted against the terminal ends 39 of the electrochemical cells 32 as the bus bar carrier 42 is disposed over the terminal ends 39 and as the bus bars 44 are coupled with the terminals 36 extending from the terminal ends 39 are substantially equal. The layer of compliant thermal epoxy 54 also enables improved heat transfer from the bottom ends 50 of the electrochemical cells 32 to the bottom wall 52 of the housing 30 (and/or to the heat sink 60 disposed in the bottom wall 52 of the housing 30).

Figure 6:
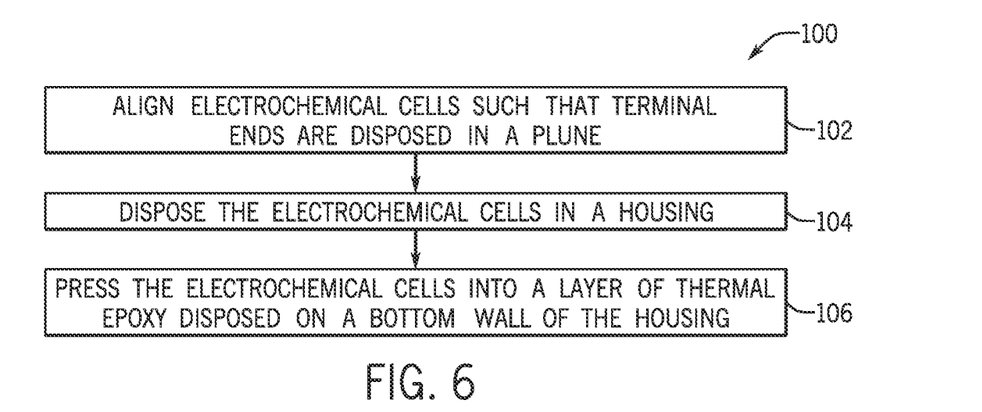
FIG. 6 is a block diagram of a method of manufacturing a battery module, in accordance with an aspect of the present disclosure.

An embodiment of a method 100 of manufacturing a battery module in accordance with the present disclosure is illustrated in FIG. 6. In the illustrated embodiment, the method 100 includes aligning electrochemical cells of the battery module such that terminal ends of the electrochemical cells are disposed in a single plane (102). For example, the electrochemical cells may be fixed to one another via layers of double sided adhesive disposed between adjacent electrochemical cells. In other words, the electrochemical cells may be disposed in a stack, with pairs of adjacent electrochemical cells being bound together via layers of double sided adhesive disposed between the adjacent electrochemical cells of the pair. The terminal ends of the electrochemical cells may be aligned with one another before and/or during the process of adhering the electrochemical cells to one another.

The method 100 also includes disposing the electrochemical cells in a housing (block 104). For example, the electrochemical cells may be disposed in a stack, aligned with one another, and coupled together as described above. The stack of electrochemical cells may be disposed together through a cell receptacle region of the housing and into an interior of the housing in fluid communication with the cell receptacle region. In another embodiment, the electrochemical cells may be inserted into the housing individually and aligned and/or adhered together (e.g., one-by-one) within the housing.

The method 100 also includes pressing the electrochemical cells into (or disposing the electrochemical cells on) a layer of thermal epoxy (e.g., compliant thermal epoxy) disposed on a bottom wall of the housing (block 106). In general, because of manufacturing imperfections and engineering tolerances, each of the electrochemical cells of the battery module may include a different height than the other electrochemical cells of the battery module. Accordingly, after aligning the terminal ends of the electrochemical cells and bonding them together, the bottom ends of the electrochemical cells may not be aligned (e.g., the bottom ends may extend different distances from the aligned terminal ends). Thus, the layer of compliant thermal epoxy conforms with the unaligned bottom ends of the electrochemical cells to fully occupy a space between the bottom ends of the electrochemical cells and a bottom wall of the housing on which the layer of compliant thermal epoxy is disposed. The layer of compliant thermal epoxy enables improved heat transfer from the bottom ends of the electrochemical cells to the bottom wall of the housing. The layer of compliant thermal epoxy also supports each of the bottom ends equally such that forces exerted against the terminals or terminal ends of the electrochemical cells via the bus bars and/or bus bar carrier are substantially equal across the battery module.

In certain embodiments, the method 100 may also include disposing a heat sink in the bottom wall of the housing and/or in contact with the layer of compliant thermal epoxy. Including the heat sink may further improve the heat transfer from the bottom ends of the electrochemical cells.

One or more of the disclosed embodiments, alone or in combination, may provide one or more technical effects useful in the manufacture of battery modules, and portions of battery modules. In general, embodiments of the present disclosure include a battery module having a stack of electrochemical cells disposed in a housing of the battery module, where the terminal ends of the electrochemical cells are aligned with one another and disposed in a single plane of the stack. Due to manufacturing imperfections (e.g., engineering tolerances), certain or each of the electrochemical cells may include a different height than certain or each the other electrochemical cells. A layer of thermal epoxy (e.g., compliant thermal epoxy) may be disposed proximate to bottom sides (e.g., bottom ends) of the electrochemical cells (e.g., on a bottom wall of the housing) opposite to the terminal ends of the electrochemical cells, between the bottom ends and a bottom wall of the housing. The layer of thermal epoxy between the bottom ends of the electrochemical cells and the bottom wall of the housing may comply with the bottom ends of the electrochemical cells to fill a space between the bottom ends of the electrochemical cells and the bottom wall of the housing. In other words, the layer of thermal epoxy may conform to the bottom ends of the electrochemical cells to compensate for the electrochemical cells' differences in height. Accordingly, the layer of compliant thermal epoxy supports each of the bottom ends substantially equally (thereby facilitating improved coupling of terminals of the electrochemical cells with bus bars on the bus bar carrier, as previously described), and enables improved heat transfer from the bottom ends to the bottom wall of the housing (or a heat sink disposed in the bottom wall) by fully occupying the space between the bottom ends of the electrochemical cells and the bottom wall of the housing. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure

The invention claimed is:

1. A battery module, comprising:
   a housing having a first end and a second end opposite to the first end, wherein the first end comprises a cell receptacle opening and the second end comprises a wall with an inner surface;
   a plurality of electrochemical cells, one or more of which of varying height, each one of the plurality of electrochemical cells comprises, respectively:
   a terminal end;
   a base end;
   a first terminal having a first surface; and
   a second terminal having a second surface;
   a plurality of adhesive layers;
   a stack formed by the plurality of electrochemical cells and the plurality of adhesive layers, wherein each adhesive layer of the plurality of adhesive layers is disposed between, and in contact with, adjacent electrochemical cells of the plurality of electrochemical cells such that the adjacent electrochemical cells are adhesively joined and such that the terminal ends of the plurality of electrochemical cells are aligned in a first planar area and the base ends of one or more of the plurality of electrochemical cells are disposed in different planes, wherein the stack is configured to be received by the housing through the cell receptacle opening, and wherein the first surfaces of the first terminals and the second surfaces of the second terminals are aligned in a second planar area;
   a layer of thermal epoxy disposed between the inner surface of the wall of the second end of the housing and the base ends of the plurality of electrochemical cells opposite to the terminal ends and enabling the alignment of the terminal ends of the plurality of electrochemical cells of varying height when seated in the housing; and
   a bus bar carrier disposed in the cell receptacle opening, the bus bar carrier retaining bus bars disposed thereon, wherein the terminals are configured to extend through openings in the bus bar carrier to access the bus bars disposed on the bus bar carrier, wherein the terminals do not extend above a plane of a surface of the bus bar carrier on which the bus bar is positioned, the bus bars being electrically coupled to and abutting the first surfaces of the first terminals and the second surfaces of the second terminals extending from the aligned terminal ends of the plurality of electrochemical cells.

2. The battery module of claim 1, wherein the wall of the second end of the housing is at least partially formed by the heat sink, wherein a first face of the layer of thermal epoxy is configured to physically contact the base ends of the plurality of electrochemical cells, and wherein a second face of the layer of thermal epoxy opposite to the first face physically contacts the heat sink.

3. The battery module of claim 1, wherein the plurality of electrochemical cells comprises a plurality of prismatic, lithium-ion (Li-ion) electrochemical cells.

4. The battery module of claim 1, wherein the layer of thermal epoxy comprises a volume per electrochemical cell of 0.83-2.5 cubic centimeters.

5. The battery module of claim 1, comprising an additional stack formed by an additional plurality of electrochemical cells and an additional plurality of adhesive layers, wherein the additional stack is configured to be received by the housing through the cell receptacle opening, and wherein the plurality of electrochemical cells are not adhesively joined to the additional plurality of electrochemical cells via the plurality of adhesive layers or by the additional plurality of adhesive layers.

6. The battery module of claim 5, wherein the plurality of electrochemical cells comprises three electrochemical cells and the additional plurality of electrochemical cells comprises three additional electrochemical cells.

7. The battery module of claim 1, wherein the bus bar carrier is arranged such that all the bus bars are disposed an equal distance from the stack.

8. The battery module of claim 1, wherein the layer of thermal epoxy comprises a volume in the range of 5 to 15 cubic centimeters.

* * * * *